US009025868B2

(12) United States Patent  
Gurbuz

(10) Patent No.: US 9,025,868 B2  
(45) Date of Patent: May 5, 2015

(54) METHOD AND SYSTEM FOR IMAGE PROCESSING TO DETERMINE A REGION OF INTEREST

(71) Applicant: Sony Corporation, Tokyo (JP)

(72) Inventor: Sabri Gurbuz, Sunnyvale, CA (US)

(73) Assignee: Sony Corporation, Tokyo (JP)

(*) Notice: Subject to any disclaimer, the term of this patent is extended or adjusted under 35 U.S.C. 154(b) by 125 days.

(21) Appl. No.: 13/779,096

(22) Filed: Feb. 27, 2013

(65) Prior Publication Data

US 2014/0241624 A1    Aug. 28, 2014

(51) Int. Cl.
  *G06K 9/00*   (2006.01)
  *G06T 7/00*   (2006.01)
  *G06K 9/34*   (2006.01)

(52) U.S. Cl.
  CPC ..... *G06T 7/0081* (2013.01); *G06T 2207/20144* (2013.01)

(58) Field of Classification Search
  CPC .. G06K 9/00234; G06K 9/38; G06K 9/00248
  USPC ........ 382/118, 154, 162, 164, 165, 168, 172, 382/224–225, 254; 348/51, 606–624; 345/428, 581; 375/240.11
  See application file for complete search history.

(56) References Cited

U.S. PATENT DOCUMENTS

| 5,631,975 | A |  | 5/1997 | Riglet et al. |
| 6,661,918 | B1 | * | 12/2003 | Gordon et al. ............... 382/173 |
| 6,999,093 | B1 | * | 2/2006 | Wetzel et al. ............... 345/581 |
| 7,006,568 | B1 | * | 2/2006 | Gu et al. ................. 375/240.11 |
| 7,583,294 | B2 |  | 9/2009 | Ray et al. |
| 2005/0093892 | A1 | * | 5/2005 | Redert ......................... 345/660 |
| 2007/0269108 | A1 |  | 11/2007 | Steinberg et al. |
| 2013/0094705 | A1 | * | 4/2013 | Tyagi et al. .................. 382/103 |
| 2014/0044347 | A1 | * | 2/2014 | Sato ............................ 382/154 |
| 2014/0092221 | A1 | * | 4/2014 | Nagai ........................... 348/51 |

FOREIGN PATENT DOCUMENTS

WO    WO2010027476 A    3/2010

* cited by examiner

*Primary Examiner* — Amir Alavi  
(74) *Attorney, Agent, or Firm* — Sony Corporation

(57) ABSTRACT

Various aspects of a system and method for image processing may include a computing device having one or more processors. The computing device may be operable to determine luminance values of multiple pixels in a subset of a frame of a two-dimensional image. The computing device may be operable to determine texture values of the multiple pixels in the subset of the frame. The computing device may be operable to identify a subject region and a background region in the frame of the two-dimensional image based on the determined luminance values and the determined texture values of the plurality of pixels.

26 Claims, 15 Drawing Sheets

Distinctiveness Indicator: 0/1

METHOD AND SYSTEM FOR IMAGE PROCESSING TO DETERMINE A REGION OF INTEREST

CROSS-REFERENCE TO RELATED APPLICATIONS/INCORPORATION BY REFERENCE

None.

FIELD

Various embodiments of the disclosure relate to a method and system for image processing. More specifically, various embodiments of the disclosure relate to a method and system for image processing, to determine a region of interest.

BACKGROUND

In image processing, conversion of two-dimensional (2D) images to three-dimensional (3D) images is a growing area of interest in a variety of applications. Relative depth assignment to objects in a 3D image plays an important role in 2D-to-3D image conversion. Depth of objects in an image is assigned in relation to a background. To accomplish this, the image is segmented to distinguish these objects from the background. However, certain objects in the image, such as human hair, differ significantly in appearance from person-to-person. Differences may include varying tones of hair color and lighting effects. In occasional cases, hair and background colors may have similar intensities. In view of these challenges, existing techniques fail to accurately distinguish certain objects from the background, and therefore fail to assign correct relative depth to these objects.

Further limitations and disadvantages of conventional and traditional approaches will become apparent to one of skill in the art, through comparison of such systems with some aspects of the present disclosure, as set forth in the remainder of the present application, with reference to the drawings.

SUMMARY

A system and method are provided for image processing substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
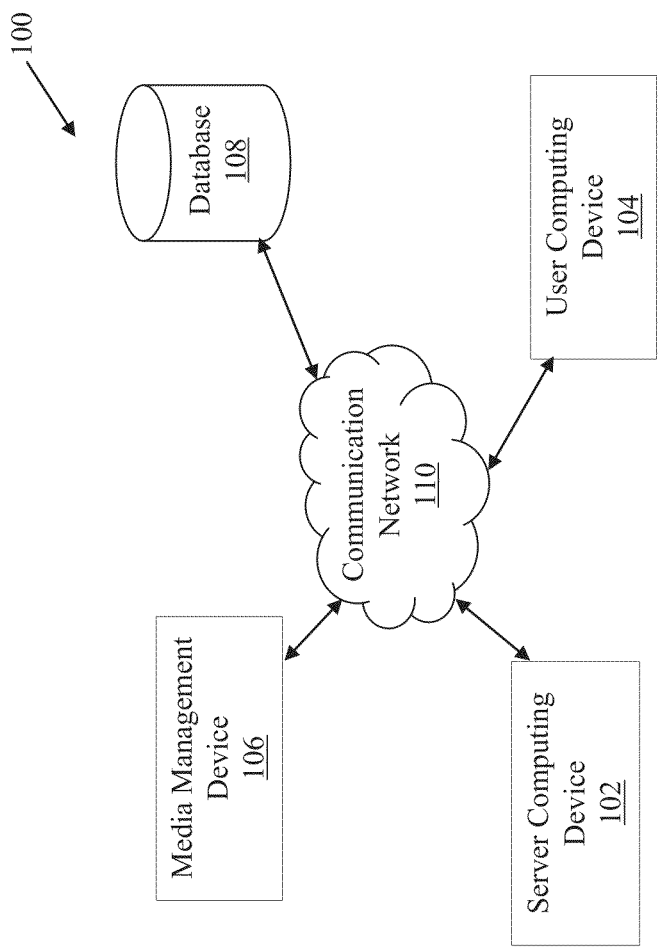
FIG. 1 is a block diagram illustrating a network environment for image processing, in accordance with an embodiment of the disclosure.

Various implementations may be found in a system and method for image processing to determine a region of interest.

Exemplary aspects of a method for image processing may include a computing device having one or more processors. In an embodiment, the computing device may be operable to determine luminance values of multiple pixels in a subset of a frame of a two-dimensional image. The computing device is further operable to determining texture values of the multiple pixels in the subset of the frame. The computing device is operable to identify a subject region and a background region in the frame of the two-dimensional image based on the determined luminance values and the determined texture values of the multiple pixels.

In an embodiment, the luminance values and the textures values of the pixels are stored in a first set of lookup tables and a second set of lookup tables respectively. The identification of the subject region and the background region in the frame of the two-dimensional image comprises classifying the multiple pixels into a first class and/or a second class based on a comparison of the luminance values and the texture values of the pixels with the first set of lookup tables and the second set of lookup tables respectively. In an embodiment, the first class comprises a head class and the second class comprises a background class. The head class may further comprise a face class and a hair class.

In an embodiment, the computing device is further operable to convert the two-dimensional image to a three-dimensional image based on the identification of the subject region and the background region in the two-dimensional image.

Exemplary aspects of a method for image processing may include a computing device having one or more processors. In an embodiment, the computing device may be operable to generate a first set of values, based on luminance of a first class of pixels and a second class of pixels, in a first two-dimensional image. As used herein, the luminance of pixels in an image is the brightness distribution or luminosity information of one or more objects in the image. The computing device is further operable to generate a second set of values, based on texture of the first class of pixels and the second class of pixels in the first two-dimensional image. The computing device may classify a subject pixel into one of a first class of pixels and a second class of pixels based on a comparison of a luminance value of the subject pixel and a texture value of the subject pixel with the generated first set of values and the generated second set of values respectively.

In an embodiment, the subject pixel belongs to the first two dimensional image. In another embodiment, the subject pixel belongs to a second two-dimensional image different from the first two-dimensional image. In an embodiment, the first class comprises a head class and the second class comprises a background class. The head class may further comprise a face class and a hair class.

In an embodiment, the computing device may determine a region of interest in the first two-dimensional image, based on the first set of values and the second set of values. In an embodiment, the computing device may determine a region of interest in a second two-dimensional image, based on the first set of values and the second set of values.

The first set of values corresponds to a first set of lookup tables (LUTs) that store the histogram counts of luminance values from the first class of pixels and the second class of pixels of the first two-dimensional image. The first set of LUTs represent class conditional probability distributions for the first and second class of pixels. The second set of values corresponds to a second set of LUTs to store gradient distinctiveness indicator functions for the first class of pixels.

Exemplary aspects of a method for image processing may include a computing device having one or more processors. In an embodiment, the computing device may be operable to determine a region of interest (ROI) in a two-dimensional image, herein referred to as a two-dimensional ROI image. The computing device may determine a first class of pixels and a second class of pixels in the two-dimensional ROI image based on a first set of predetermined values corresponding to a luminance of the two-dimensional image. The computing device may analyze the texture of the first class of pixels and the second class of pixels corresponding to the texture of said two-dimensional image to determine the region of interest. The computing device may be further operable to convert the two-dimensional image to a three-dimensional image based on the determination of the region of interest in the two-dimensional ROI image. The 3D images obtained from the conversion are then utilized to render 3D media content.

In an embodiment, the two-dimensional ROI image is generated from a two-dimensional input image. In an example, a two-dimensional (2D) media content comprising a sequence of moving images is divided into multiple 2D image frames. Each image frame from the sequence of moving images represents the two-dimensional input image. The two-dimensional ROI image is generated by cropping, resizing and down-quantizing the two-dimensional input image. The two-dimensional ROI image has a lower dimension compared to the two-dimensional input image.

In an embodiment, the method further comprises predicting a first region and a second region in the two-dimensional ROI image. The predicted first region and second region correspond to sample regions in the two-dimensional ROI image where the first class of pixels and second class of pixels are likely to be present. For example, the predicted first region and the predicted second region comprise a head region and a background region, respectively. The first class of pixels and second class of pixels are determined by computing class-conditional probability functions using Bayes rule, based on luminance of the first and second class of pixels and a first set of predetermined values. Each class conditional probability function represents the probability of one event on the condition that another event occurs.

In an embodiment, the first set of predetermined values corresponds to a first set of lookup tables (LUTs). The first set of LUTs store histogram counts of luminance values from the first class of pixels and the second class of pixels of the two-dimensional ROI image and/or at least one previous two-dimensional image.

The analyses of texture comprise computing gradient distinctiveness indicator functions for the first class of pixels and the second class of pixels. The uniqueness of the first class of pixels as compared to the second class of pixels is determined based on the computed gradient distinctiveness indicator functions and a second set of predetermined values. In an embodiment, the second set of predetermined values corresponds to a second set of lookup tables. The second set of lookup tables store the gradient distinctiveness indicator functions for the first class of pixels of the two-dimensional ROI image and/or at least one previous two-dimensional image.

In an embodiment, the first class of pixels comprises a head class and the second class of pixels comprises a background class. The head class may further comprise a face class and a hair class. The region of interest is a human hair region, a head region, or a combination thereof. In an embodiment, the determined region of interest is represented as a Boolean-type image.

In an embodiment, the region of interest represented as a Boolean-type image is subjected to one or more post-processing tasks. The region of interest is subjected to image smoothing by filling gaps within the region of interest. The disconnected patches, or outliers, around the region of interest are then eliminated. The outer contour of the region of interest is detected to generate a region of interest (ROI) image mask. The ROI image mask is then restored to the original scale of the two-dimensional input image.

FIG. 1 is a block diagram illustrating a network environment for image processing, in accordance with an embodiment of the disclosure. With reference to FIG. 1, there is shown a network environment 100. The network environment 100 may comprise a server computing device 102, a user computing device 104, a media management device 106, a database 108, and a communication network 110. The server computing device 102 and the user computing device 104 may also be collectively referred to herein as the computing device 102/104.

The server computing device 102 may comprise suitable logic, circuitry, interfaces, and/or code that may enable receiving and processing of still and moving images directly from the media management device 106, or via the communication network 110. For example, the server computing device 102 may be operable to perform image segmentation of the received images, relative depth assignment to objects in the images, and 2D-to-3D image conversion. In an embodiment, the server computing device 102 may be implemented as a cloud-based server. The server computing device 102 may store and periodically update one or more sets of self-learning LUTs, either autonomously or in association with the database 108. An administrator user may interact with the server computing device 102 directly. In other embodiments, the administrator user may issue commands or instructions indirectly to the server computing device 102 over the communication network 110.

The user computing device 104 may comprise suitable logic, circuitry, interfaces, and/or code that may enable receiving and processing of still and moving images directly from the media management device 106, or via the communication network 110. For example, the user computing device 104 may also be operable to perform image segmentation of the received images, relative depth assignment to objects in the images, and 2D-to-3D image conversion. The user computing device 104 may include one or more of a computer, a smart phone, a mobile device, a personal digital assistant (PDA), a laptop, a tablet PC, and consumer devices or appliances, such as a television and/or a set-top box. Notwithstanding, the disclosure may not be so limited, and other types of user computing devices 104 may be communicatively coupled to the media management device 106 and the server computing device 102, without limiting the scope of the disclosure. The user computing device 108 may also include computing devices capable of receiving and rendering media content. The user computing device 104 may also be operable to store and periodically update one or more sets of self-learning LUTs in association with the database 108. An end user may interact with the user computing device 104 directly. In other embodiments, the administrator user may issue commands or instructions indirectly to the server computing device 102 over the communication network 110.

The media management device 106 may comprise suitable logic, circuitry, interfaces, and/or code that may enable capturing, storing, and distributing media directly to the server computing device 102 and/or the user computing device 104, or via the communication network 110. For example, the captured media comprises still images and moving images. The media management device 106 may be operable to capture the moving and/or still images at configurable resolutions and in different image-capture formats. The media management device 106 may be further operable to perform production, distribution and management of various forms of media content such as television content, on-demand media content, web-based content, and personal content. The format of the media content can include, but not limited to, AVI, MPEG, and DivX. In an embodiment, the media management device 106 may be operable to broadcast moving images to user computing devices 104 via the network. The media management device 106 may distribute or transfer the moving images to the server computing device 102, or the user computing device 104, via wired or wireless communication protocols. The media management device 106 may also comprise mass storage devices to store the captured media for subsequent transfer or distribution.

The database 108 may comprise suitable logic, circuitry, interfaces, and/or code that may enable storage and transfer of media and data to the server computing device 102 and the user computing device 104. The database 108 is operable to store and periodically update one or more sets of self-learning LUTs, according to instructions from the server computing device 102 and the user computing device 104.

The communication network 110 may include a medium through which various computing devices 104, in the computing environment 100, may receive and transmit media content and data. Examples of the communication network 110 may include, but are not limited to, the Internet, a Wireless Fidelity (WiFi) network, a Wireless Local Area Network (WLAN), a Local Area Network (LAN), a telephone line (POTS), or a Metropolitan Area Network (MAN). Various devices in the computing environment 100 may be operable to connect to the communication network 110, in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, Infra Red (IR), IEEE 802.11, 802.16, cellular communication protocols, and/or Bluetooth (BT) communication protocols.

In operation, the server computing device 102 or the user computing device 104, collectively referred to herein as the computing device 102/104, may receive two-dimensional (2D) media content such as moving images or still images from the media management device 106. In an embodiment, the computing device 102/104 may divide the moving images to create a sequence of individual 2D image frames in a suitable format, including but not limited to, joint photographic experts group (JPEG), portable network graphics (PNG), graphics interchange format (GIF), and tagged image file format (TIFF) formats. The computing device 102/104 may generate luminance information from the 2D image frames. The computing device 102/104 may extract the luminance information from the 2D image frames. In an embodiment, the computing device 102/104 may receive two-dimensional images directly from the media management device 106, or from another computing device. The computing device 102/104 may determine luminance values of multiple pixels in a subset of a frame of a two-dimensional image. The computing device 102/104 may determine texture values of the multiple pixels in the subset of the frame based on distinctive gradients of the pixels. The computing device 102/104 may identify a subject region and a background region in the frame of the two-dimensional image based on the determined luminance values and the determined texture values of the multiple pixels.

In an embodiment, the computing device 102/104 may identify the subject region and the background region in the frame of the two-dimensional image by classifying the pixels into a first class and/or a second class based on a comparison of the luminance values and the texture values of the pixels with a first set of lookup tables and a second set of lookup tables respectively. In an example, the identified subject region comprises a hair region and/or a head region.

In an embodiment, the computing device 102/104 may convert the two-dimensional image to a three-dimensional image based on the identification of the subject region and the background region in the two-dimensional image.

In an embodiment, the computing device 102/104 may generate a first set of values based on luminance of a first class of pixels and a second class of pixels in a first two-dimensional image. In an embodiment, the first set of values corresponds to a first set of lookup tables (LUTs). The first set of LUTs store histogram counts of luminance values for a first class of pixels and a second class of pixels. The first set of LUTs represent class conditional probability distributions for the first and second class of pixels. The computing device 102/104 may generate a second set of values based on the texture of the first class of pixels and the second class of pixels in the first two-dimensional image. The second set of values corresponds to a second set of LUTs. In an embodiment, the second set of LUTs store gradient distinctiveness indicator functions for the first class of pixels. In an embodiment, the computing device 102/104 may generate the first set of LUTs and the second set of LUTs as part of a continuous self-training routine. The computing device 102/104 may transfer the generated first set of LUTs and the second set of LUTs to the database 108 for storage. The computing device 102/104 may determine a region of interest in the first two-dimensional image based on the first set of values and the second set of values. In an embodiment, the computing device 102/104 may determine a region of interest in a second two-dimensional image based on the first set of values and the second set of values.

In an embodiment, the computing device 102/104 may determine a region of interest (ROI) in a two-dimensional image, herein also referred to as a two-dimensional ROI image. The computing device 102/104 may determine a first class of pixels and a second class of pixels in the two-dimensional ROI image based on a first set of predetermined values. For example, the first class of pixels comprises a head class and the second class of pixels comprises a background class. In an embodiment, the head class further comprises a face class and a hair class. The computing device 102/104 may analyze the texture of the first class of pixels and the second class of pixels based on a second set of predetermined values. The determined region of interest comprises a head region, a hair region, or a combination thereof.

In an embodiment, the computing device 102/104 may be operable to predict a first region and a second region in the two-dimensional ROI image. The predicted first region and second region correspond to sample regions in the two-dimensional ROI image where the first class of pixels and second class of pixels are likely to be present. For example, the predicted first region and the predicted second region may comprise a head region and a background region, respectively. The computing device 102/104 may determine the first class of pixels and second class of pixels by computing class-conditional probability functions using Bayes rule based on luminance of the first and second class of pixels and the first set of predetermined values.

In an embodiment, the first set of predetermined values corresponds to a first set of lookup tables (LUTs). The first set of LUTs store histogram counts of luminance values of the first class of pixels and the second class of pixels of the two-dimensional ROI image and/or at least one previous two-dimensional image.

In an embodiment, the computing device 102/104 may be operable to analyze the texture by computing gradient distinctiveness indicator functions for the first class of pixels and the second class of pixels. The computing device 102/104 determines the uniqueness of the first class of pixels as compared to the second class of pixels, based on the computed gradient distinctiveness indicator functions and a second set of predetermined values. In an embodiment, the second set of predetermined values corresponds to a second set of LUTs. The second set of LUTs store the gradient distinctiveness indicator functions for the first class of pixels from the two-dimensional ROI image and/or at least one previous two-dimensional image.

In an embodiment, the computing device 102/104 may generate the two-dimensional ROI image from a two-dimensional input image. Each two-dimensional input image is a two-dimensional (2D) image frame from a sequence of moving images of a 2D media content. The computing device 102/104 generates the two-dimensional ROI image by cropping, resizing and down quantizing each two-dimensional input image. The order and recurrence of the cropping, resizing and down-quantizing operations to generate the two-dimensional ROI image may be predetermined or random. The two-dimensional ROI image has a lower dimension compared to the two-dimensional input image. In an embodiment, the computing device 102/104 may be operable to convert each 2D image frame to a 3D image, based on the determination of the region of interest in the 2D image frame.

Figure 2:
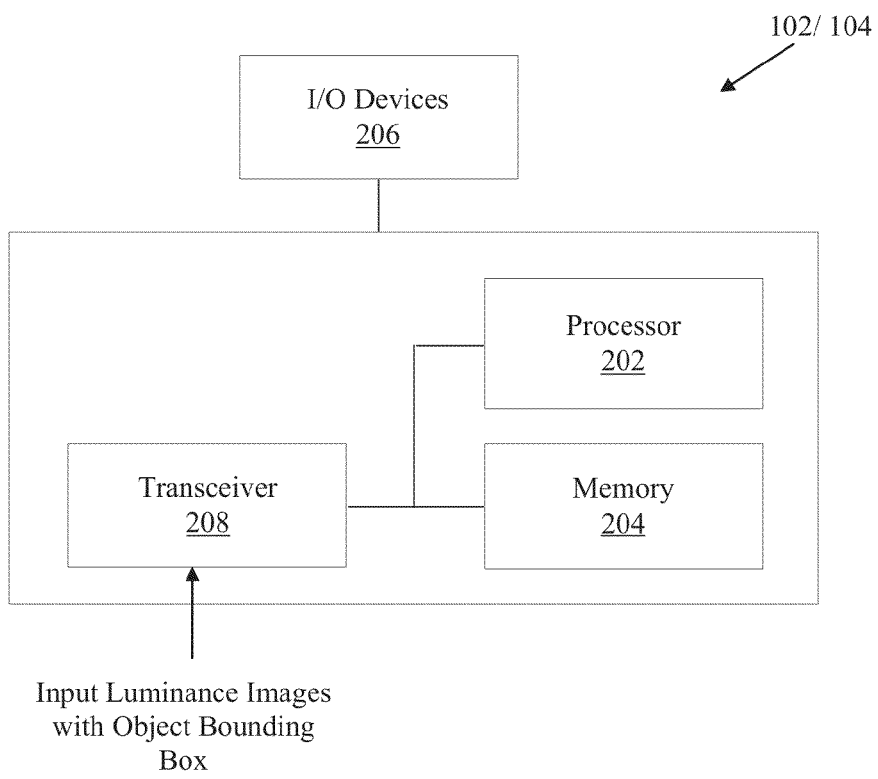
FIG. 2 is a block diagram illustrating a computing device for image processing to determine a subject region and a background region, in accordance with an embodiment of the disclosure.

FIG. 2 is a block diagram illustrating a computing device for image processing to determine a region of interest, in accordance with an embodiment of the disclosure. FIG. 2 is explained in conjunction with elements from FIG. 1. With reference to FIG. 2, there is shown the computing device 102/104. In an embodiment, the computing device depicted in FIG. 2 is the server computing device 102. In another embodiment, the computing device depicted in FIG. 2 is the user computing device 104. The computing device 102/104 may comprise a processor 202, a memory 204, Input-Output (I/O) devices 206, and a transceiver 208.

The processor 202 may be communicatively coupled to the memory 204, and the I/O devices 206. Further, the transceiver 208 may be communicatively coupled to the processor 202, the memory 204, and the I/O devices 206.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a RISC processor, an ASIC processor, a CISC processor, or any other processor.

The memory 204 may comprise suitable logic, circuitry, interfaces, and/or code that may be operable to store the received set of instructions. The memory 204 may be implemented based on, but not limited to, a Random Access Memory (RAM), a Read-Only Memory (ROM), a Hard Disk Drive (HDD), a storage server and/or a secure digital (SD) card.

The I/O devices 206 may comprise various input and output devices operably connected to the processor 202. Examples of input devices include, but are not limited to, a keyboard, a mouse, a joystick, a touch screen, a microphone, a camera, a motion sensor, a light sensor, and/or a docking station. Examples of output devices include, but are not limited to, a display and a speaker.

The transceiver 208 may comprise suitable logic, circuitry, interfaces, and/or code that may be operable to communicate with the media management device 106 and the database 108. The transceiver 208 may implement known technologies for supporting wired or wireless communication with the communication network 110.

In operation, the processor 202 may be operable to receive two-dimensional (2D) media content such as moving images or still images from the media management device 106. In an embodiment, the processor 202 may divide the moving images to create a sequence of individual 2D image frames in a suitable format. The processor 202 may generate luminance-only images from the 2D image frames. The processor 202 may generate the luminance-only images by extracting luminance information from the 2D image frames. Each 2D image frame constitutes a two-dimensional input image to the processor 202. In an embodiment, the processor 202 may generate a two-dimensional ROI image of a lower dimension from the two-dimensional input image. The two-dimensional ROI image is generated by cropping, resizing and down-quantizing the two-dimensional input image, based on an object bounding box of an object-detection algorithm. The order and recurrence of the cropping, resizing and down-quantizing operations to generate the two-dimensional ROI image may be predetermined or arbitrary. The memory requirement of the two-dimensional ROI image is lower than the memory requirement of the two-dimensional input image.

The processor 202 may be operable to determine luminance values of multiple pixels in a subset of a frame of a two-dimensional ROI image. The processor 202 may be operable to determine texture values of the multiple pixels in the subset of the frame based on distinctive gradients of the pixels. The processor 202 may be operable to identify a subject region and a background region in the frame of the two-dimensional image based on the determined luminance values and the determined texture values of the multiple pixels.

In an embodiment, the processor 202 may be operable to identify the subject region and the background region in the frame of the two-dimensional ROI image by classifying the pixels into a first class and/or a second class based on a comparison of the luminance values and the texture values of the pixels with a first set of lookup tables and a second set of lookup tables respectively. In an example, the identified subject region comprises a hair region and/or a face region.

In an embodiment, the processor 202 may be operable to convert the two-dimensional image to a three-dimensional image based on the identification of the subject region and the background region in the two-dimensional ROI image.

In an embodiment, the processor 202 may be operable to generate a first set of values, based on luminance of a first class of pixels and a second class of pixels in a first two-dimensional ROI image. For example, the first set of values corresponds to a first set of lookup tables (LUTs) to store histogram counts of luminance values for a first class of pixels and a second class of pixels. The first set of LUTs represent class conditional probability distributions for the first and second class of pixels. The processor 202 may generate a second set of values based on the texture of the first class of pixels and the second class of pixels in the first two-dimensional ROI image. For example, the second set of values corresponds to a second set of LUTs to store gradient distinctiveness indicator functions for the first class of pixels in the first two-dimensional ROI image. In an embodiment, the processor 202 may generate the first set of LUTs and the second set of LUTs as part of a self-training routine. The processor 202 may transfer the generated first set of LUTs and the second set of LUTs to the database 108 for storage.

The processor 202 may determine a region of interest (ROI) in the first two-dimensional ROI image based on the first set of values and the second set of values. In an embodiment, the processor 202 determines a region of interest in a second two-dimensional ROI image, based on the first set of values and the second set of values. The processor 202 may determine a first class of pixels and a second class of pixels in the second two-dimensional ROI image, based on the first set of values. For example, the first class of pixels comprises a head class and the second class of pixels comprises a background class. In an embodiment, the head class further comprises a face class and a hair class. The processor 202 may analyze the texture of the first class of pixels and the second class of pixels in the second two-dimensional ROI image, based on the second set of values. The determined region of interest comprises a head region, a hair region, or a combination thereof. The image processing to determine the region of interest, in accordance with embodiments of the disclosure, may be performed either at the server computing device 102 or at the user computing device 104.

In an embodiment, the processor 202 may be operable to predict a first region and a second region in the second two-dimensional ROI image. The predicted first region and second region correspond to exemplar regions in the second two-dimensional ROI image where the first class of pixels and second class of pixels are likely to be present. For example, the predicted first region and the predicted second region comprise a head region and a background region, respectively. The processor 202 may determine the first class of pixels and second class of pixels in the second luminance by computing class-conditional probability functions, based on luminance of the first and second class of pixels and Bayes rule.

In an embodiment, the processor 202 may be operable to analyze the texture by computing gradient distinctiveness indicator functions for the first class of pixels and the second class of pixels. The processor 202 may determine the uniqueness of the first class of pixels as compared to the second class of pixels in the second two-dimensional ROI image, based on the gradient distinctiveness indicator functions and the second set of values.

In an embodiment, the computing device converts 2D images to 3D images based on the determination of the region of interest. The 2D-to-3D conversion can be performed either at the server computing device 102 or at the user computing device 104, and both are within the scope of the disclosure.

Figure 3:
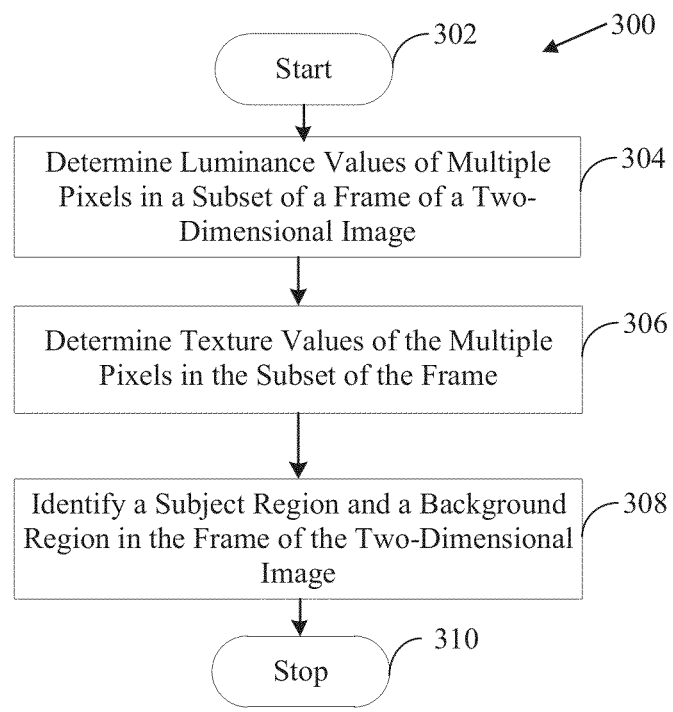
FIG. 3 is a diagram illustrating a method for image processing to determine a subject region and a background region, in accordance with an embodiment of the disclosure.

FIG. 3 is a diagram illustrating a method 300 for image processing to determine a subject region and a background region, in accordance with an embodiment of the disclosure. FIG. 3 will be described in conjunction with elements of FIG. 1 and FIG. 2. The method 300 may be implemented in a computing device 102/104 comprising one or more processors 202.

The method 300 starts at 302. At step 304, the luminance values of multiple pixels in a subset of a frame of a two-dimensional image may be determined by the computing device 102/104. At step 306, texture values of the multiple pixels in the subset of the frame may be determined by the computing device 102/104, based on distinctive gradients of the pixels. The luminance values and the textures values of the multiple pixels are stored in a first set of lookup tables and a second set of lookup tables respectively.

At step 308, a subject region and a background region in the frame of the two-dimensional image is identified based on the determined luminance values and the determined texture values of the pixels. The identification of the subject region and the background region in the frame of the two-dimensional image may comprise classifying the plurality of pixels into a first class and/or a second class based on a comparison of the luminance values and the texture values of the pixels with a first set of lookup tables and a second set of lookup tables respectively. At step 310, the method 300 ends.

Figure 4:
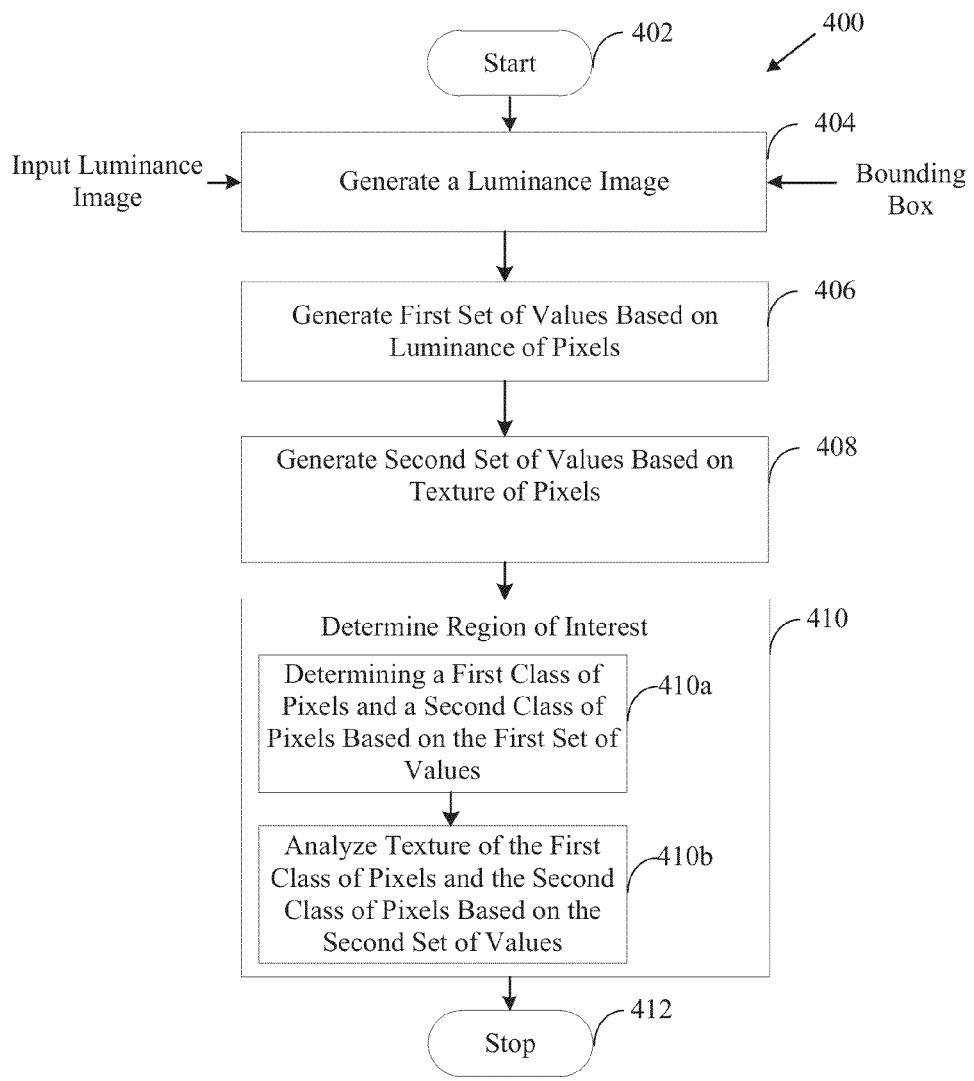
FIG. 4 is a diagram illustrating a method for image processing to determine a region of interest, in accordance with an embodiment of the disclosure.

FIG. 4 is a diagram illustrating a method 400 for image processing to determine a region of interest, in accordance with an embodiment of the disclosure. FIG. 4 will be described in conjunction with elements of FIG. 1 and FIG. 2. The method 400 may be implemented in a computing device 102/104 comprising one or more processors 202.

The method 400 starts at 402. At step 404, a two-dimensional ROI image is generated from a two-dimensional input image by the computing device 102/104, based on an object bounding box. For example, the object-bounding box is a face-detection-based face bounding box. The two-dimensional input image is cropped, resized and down-quantized, based on the face bounding box. In order to reduce the memory and gate usage for the hardware implementation, the computing device 102/104 crops, resizes, and down quantizes a broader face two-dimensional input image to a smaller two-dimensional ROI image. The memory requirement of the smaller two-dimensional ROI image is lower than the memory requirement of the actual two-dimensional input image. In an embodiment, the computing device 102/104 may perform one or more of the cropping, resizing and down quantizing operations on the two-dimensional input image to generate the smaller two-dimensional ROI image.

At step 406, a first set of values may be generated by the computing device 102/104, based on luminance values of pixels in the two-dimensional ROI image. In an embodiment, the computing device 102/104 processes one or more two-dimensional images using a frame-by-frame-based self-training algorithm that uses luminance-only image information. The computing device 102/104 may collect positive and negative exemplars with reference to the face-bounding box to form probabilistic and discriminant functions for hair and background regions. In an embodiment, the first set of values corresponds to a first set of lookup tables (LUTs) that store histogram counts of luminance values for hair class pixels and background class pixels.

At step 408, a second set of values may be generated by the computing device 102/104 based on the texture of pixels in the two-dimensional ROI image. In an embodiment, the second set of values corresponds to a second set of LUTs to store gradient distinctiveness indicator functions for the first class of pixels. In an embodiment, the computing device 102/104 may generate the first set of LUTs and the second set of LUTs as part of a continuous self-training routine. The computing device 102/104 may utilize Bayesian decision theory along with a set of hair only distinctive gradient features to determine the region of interest. The computing device 102/104 trains itself to extract these features for every image, based on the rectangular face-bounding-box information given by the Sony face-tracking (sFace) system, for example. Notwithstanding, the disclosure may not be so limited, and other types of face-tracking or facial motion capture systems may be utilized to provide the face-bounding-box information, without limiting the scope of the disclosure. The face two-dimensional ROI image is processed by the computing device 102/104 to identify hair pixels using the self-learn LUTs and the learnt features.

At step 410, the region of interest is determined by the computing device 102/104. At step 410a, a first class of pixels and a second class of pixels are determined based on the first set of values and Bayes rule. At step 410b, the texture first class of pixels and a second class of pixels are analyzed based on the second set of values. For example, the second set of values corresponds to a second set of LUTs that store gradient distinctiveness indicator functions for the first class of pixels. At step 412, the method 400 ends.

With reference to FIGS. 5-13D, an example of image processing to determine the region of interest (ROI) will be described. In this example, the region of interest is a combination of a head region and a hair region. The computing device 102/104 determines the region of interest using a hair segmentation algorithm, in accordance with embodiments of the disclosure. The definition of the interface function for the segmentation algorithm is hairSeg( . . . ). The computing device 102/104 is operable to execute the function hair Seg( . . . ) to perform hair segmentation to determine the hair region, in accordance with an embodiment of the disclosure. The input parameters for the interface function hairSeg( . . . ) include: luminance (L) of the two-dimensional (2D) input image, width (W) of the 2D input image, height (H) of the 2D input image, x-center of face-bounding box from face detection (x-coordinate) (face_xc), y-center of face-bounding box from face detection (y-coordinate) (face_yc), and half width of the face-bounding box (face_hw).

The output of the function hairSeg( . . . ) comprises a hair mask image (p_mask), containing 0s and 1s, which may be a Boolean-type image, and an optional hair-probability image (p_probMap). Other parameters in the algorithm that are set default values comprise number of quantization bits (nBits=[6]), a pointer to a memory for cropped and resized face ROI (faceI), width of the faceI (szCol=[75]), and height of the faceI (szRow=[75]). The gradient structure for texture analyses is defined with parameters such as gradient step (step=[1]), y-axis gradient range (MaxTstepY:[−2 2]), and x-axis gradient range (MaxTstepX:[−2 2]). Although, certain parameters in the algorithm are set to default values, the values of these parameters may be changed depending on the application and processing requirements without limiting the scope of the disclosure.

The function hairSeg( . . . ) calculates the required size of the texture (gradient) lookup tables (LUTs) depending on the gradient structure defined. Luminance LUTs are generated for hair and background classes (hdLumLUT, bgLumLUT), respectively. Each LUT has a size of $1\times2^{nBits}$ memory locations with unsigned integer type. The size of each texture LUT for the gradient structure disclosed herein may be $24\times2^{nBits}$ Boolean type. In order to reduce the memory consumption by the LUTs, the computing device 102/104 down quantizes the cropped face image to the specified nBits parameter value. The down quantization is performed in real time using the cropAndRszHeadROI( . . . ) function. The down quantization of the input 2D image reduces the memory requirements for the histogram based LUTs. The function hairSeg( . . . ) then calls the related subroutines to perform various sub-tasks of hair segmentation as described with references to FIGS. 5-13D.

Figure 5:
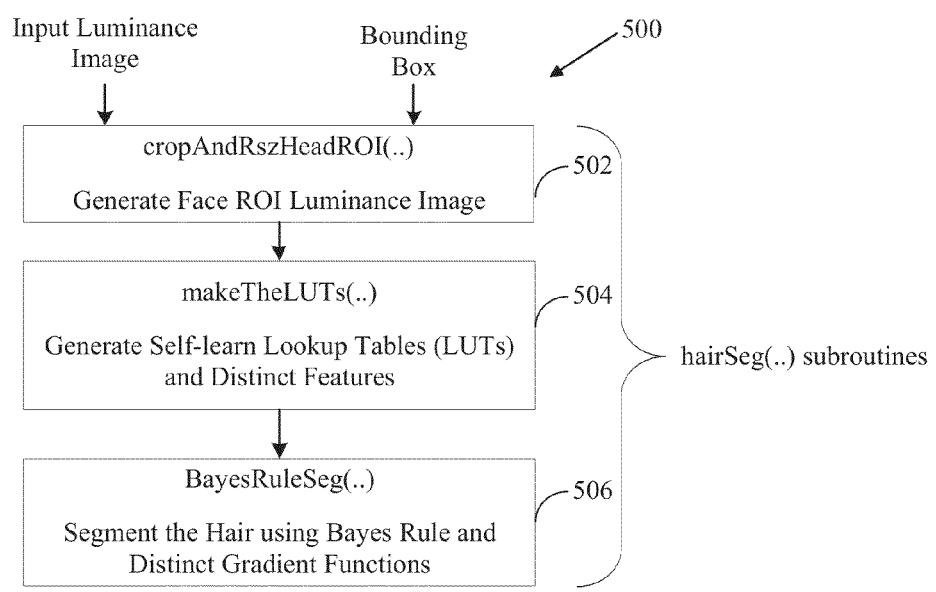
FIG. 5 is a flow chart illustrating a sequence of sub-tasks for hair segmentation, in accordance with an embodiment of the disclosure.

FIG. 5 is a flow chart illustrating a sequence of sub-tasks for hair segmentation, in accordance with an embodiment of the disclosure. The computing device 102/104 is operable to execute one or more subroutines to perform the various sub-tasks of hair segmentation to determine the hair region, in accordance with embodiments of the disclosure. With reference to FIG. 5, there is shown a flow chart 500 depicting a sequence of sub-routines corresponding to the sub-tasks of cropping and resizing, generating self-learn lookup tables (LUTs) and distinct features, and segmenting hair using Bayes rule and distinct gradient functions. The function hair-Seg( . . . ) calls these subroutines to perform various sub-tasks of hair segmentation.

At step 502, the computing device 102/104 executes the cropAndRszHeadROI( . . . ) function to generate a two-dimensional face ROI image.

At step 504, the computing device 102/104 executes the makeTheLUTs( . . . ) function to generate self-learn lookup tables (LUTs) and distinct features.

At step, 506, the computing device 102/104 executes the BayesRuleSeg( . . . ) function to segment the hair using Bayes rule and distinct gradient functions to determine the head region.

Figure 6A:
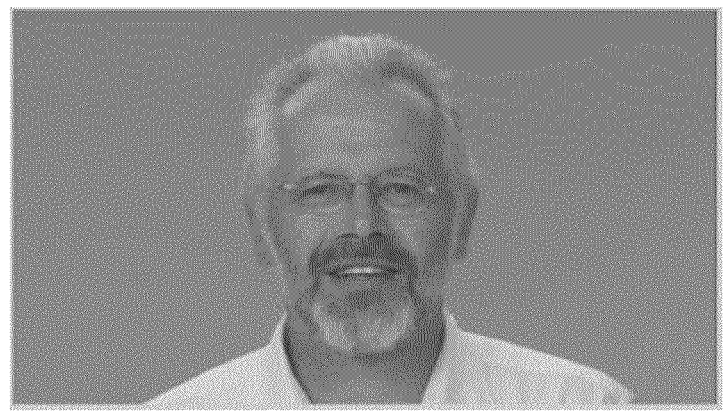
FIGS. 6A-6B are diagrams illustrating screenshots of a two-dimensional input image and a down-quantized image, in accordance with an embodiment of the disclosure.
Figure 6B:
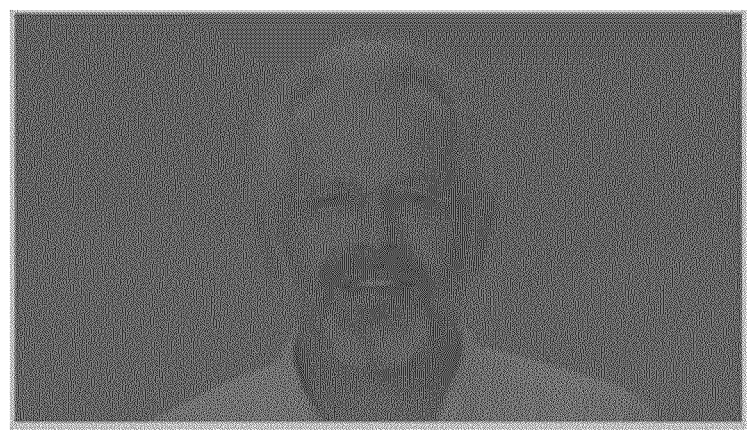

FIGS. 6A-6B are diagrams illustrating screenshots of a two-dimensional input image and a down-quantized image, in accordance with an embodiment of the disclosure. With reference to FIG. 6A, there is shown a two-dimensional input image having a resolution of 8 bits per pixel, for example. With reference to FIG. 6B, there is shown a down-quantized image having a resolution of 6 bits per pixel, for example. The input to the cropAndRszHeadROI( . . . ) function comprises the two-dimensional input image and its face-bounding-box information. The output of the cropAndRszHeadROI( . . . )

function comprises a broader face region of interest (ROI) by cropping, resizing and down quantizing the two-dimensional input image to pre-specified dimensions. The cropping, resizing and down-quantization operations reduce the memory requirement and computational cost for real-time processing of the two-dimensional images.

Figure 7B:
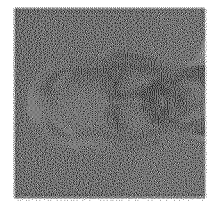
FIGS. 7A-7B are diagrams illustrating screenshots of a two-dimensional input image and a cropped, resized and down-quantized image, in accordance with an embodiment of the disclosure.
Figure 7A:
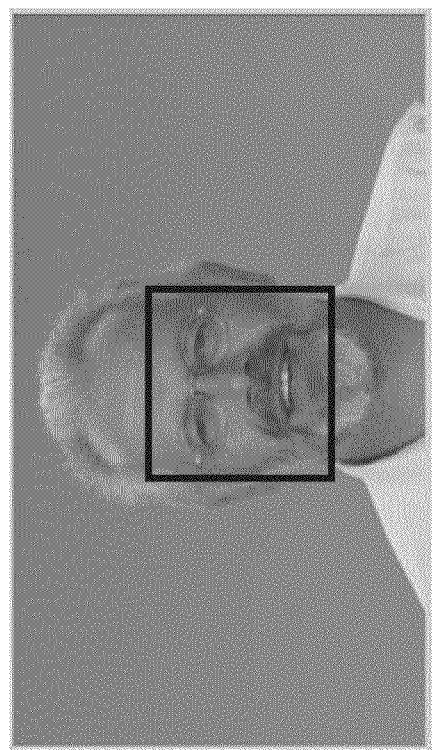

FIGS. 7A-7B are diagrams illustrating screenshots of a two-dimensional input image and a cropped, resized and down-quantized image, in accordance with an embodiment of the disclosure. With reference to FIG. 7A, there is shown the two-dimensional input image superimposed with the face bounding box. With reference to FIG. 7B, there is shown a cropped, resized and down-quantized two-dimensional face ROI image. The subsequent processing described with reference to FIGS. 8-13D is performed on the two-dimensional face ROI image illustrated in FIG. 7B.

Figure 8:
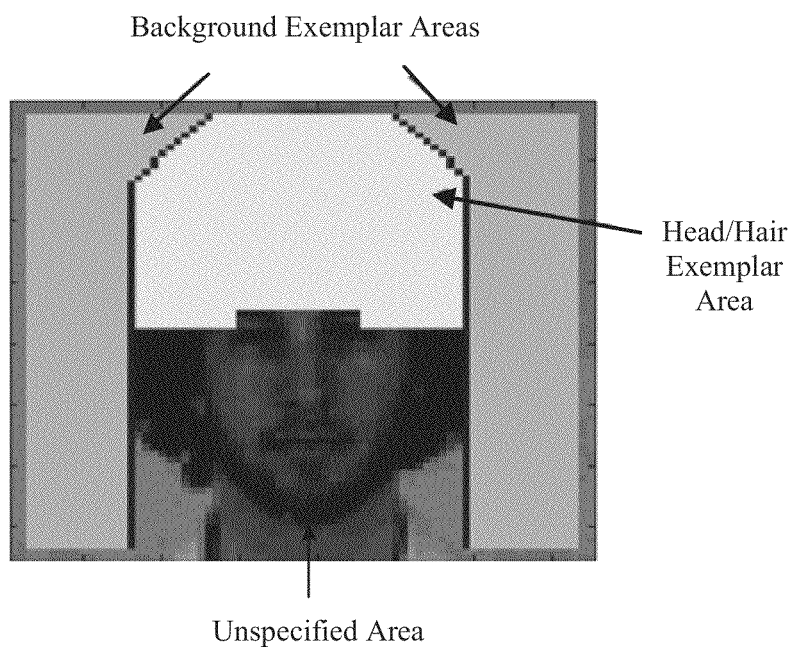
FIG. 8 is a diagram illustrating a screenshot of a two-dimensional image showing predicted locations for different classes of pixels, in accordance with an embodiment of the disclosure.

FIG. 8 is a diagram illustrating a screenshot of a two-dimensional ROI image showing predicted locations for different classes of pixels, in accordance with an embodiment of the disclosure. With reference to FIG. 8, there is shown a two-dimensional image with predicted class sample areas. The predicted class sample areas include a head/hair exemplar area, a background exemplar area and an unspecified area. As seen in FIG. 8, the hair class may comprise a mixture of hair, face and background classes. Similarly, the background class may include hair pixels in certain face examples.

The two-dimensional ROI image with predicted class sample areas of FIG. 8 constitutes the input to the makeThe-LUTs( . . . ) function. The makeTheLUTs( . . . ) function generates two sets of lookup tables (LUTs), namely, histogram-based class-conditional probability density functions, also referred to as luminance-based LUTs, and gradient-based distinct indicator functions (GraDiIndicator), also referred to as texture LUTs. The luminance-based LUTs are formed based on histogram counts of each luminance value for the background and the hair predicted areas illustrated in FIG. 8.

Figure 9A:
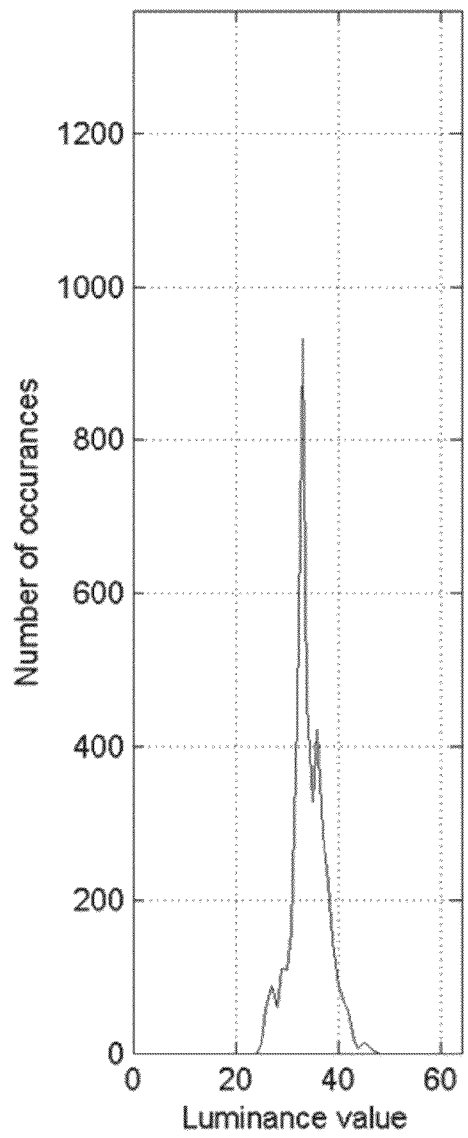
FIGS. 9A-9B are diagrams illustrating histogram plots for hair and background areas of a two-dimensional image, in accordance with an embodiment of the disclosure.
Figure 9B:
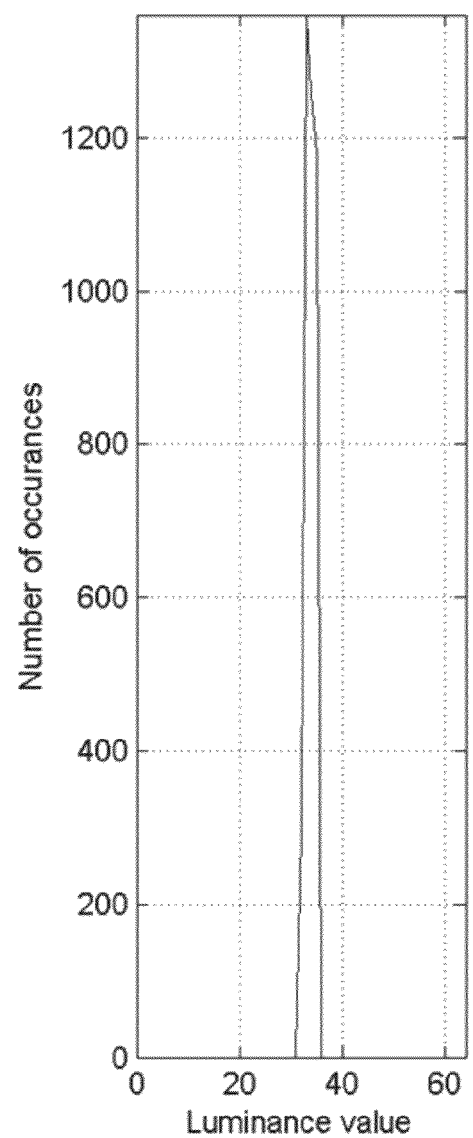

FIGS. 9A-9B are diagrams illustrating sample histogram plots for hair and background areas of the two-dimensional ROI image, respectively, in accordance with an embodiment of the disclosure. With reference to FIG. 9A, there is shown an area normalized sample histogram plot for hair area of the two-dimensional ROI image. With reference to FIG. 9B, there is shown an area normalized sample histogram plot for background area of the two-dimensional ROI image.

In order to make the LUTs independent of the sample size, the LUTs are area normalized such that the LUTs, that is, the area under the histogram plots sum to a same predetermined number (N), independent of the area size over which the data is collected. For example, $$\sum_{k=0}^{2^{nBits}} haLUT(k) = \sum_{k=0}^{2^{nBits}} bgLUT(k) = N,$$

where $nBits = 6$, and $N = 4096$.

The LUT graphs illustrated in FIGS. 9A-9B represent class-conditional probability distribution functions as p(LumValue|Class) in the Bayes rule image segmentation algorithm (BayesRuleSeg( . . . ) function). In an embodiment, the luminance-based LUTs are also generated for a skin class, where additional classification of pixels is required for image segmentation.

Figure 10:
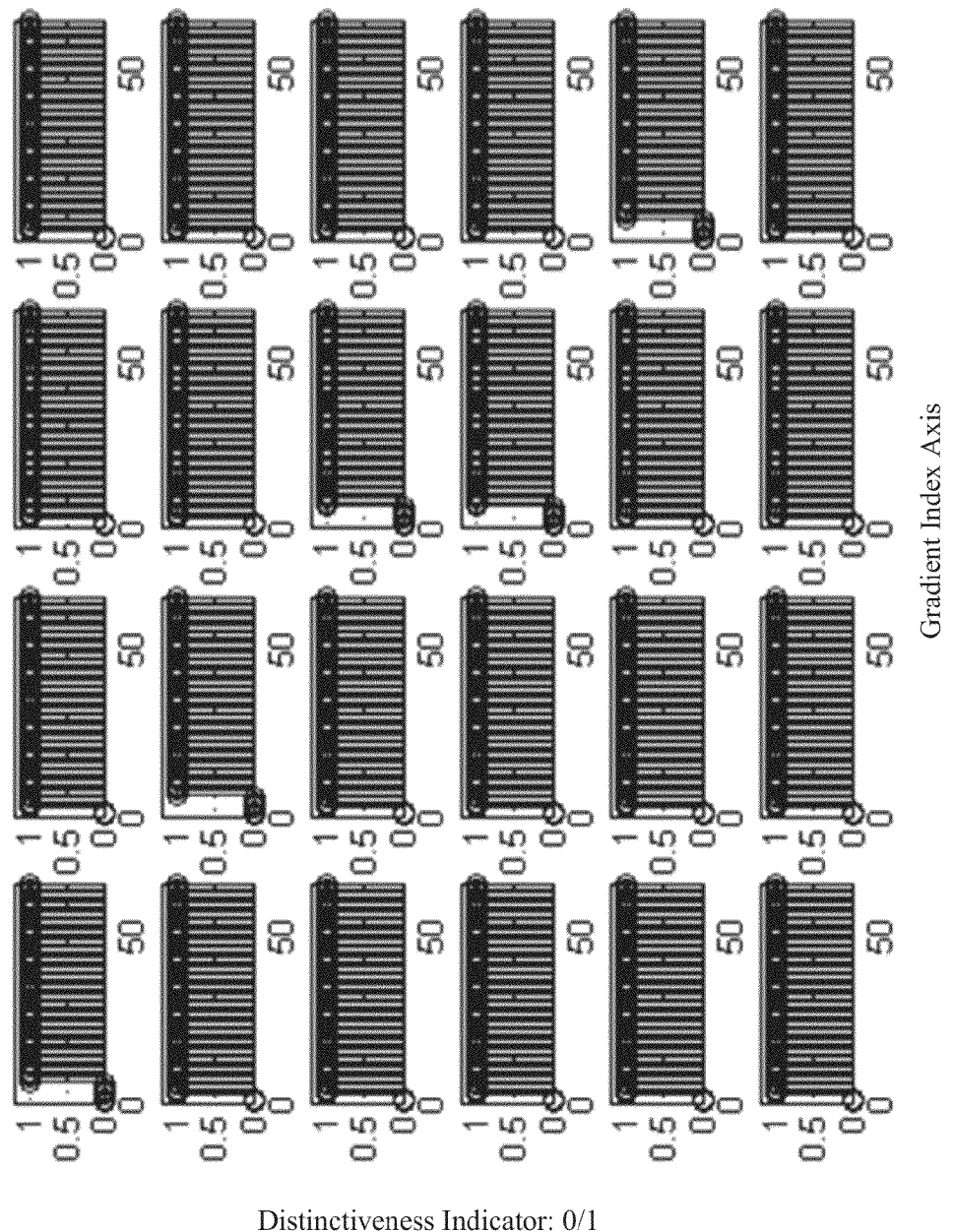
FIG. 10 is a diagram illustrating gradient-based distinctiveness functions for hair class as compared to background class, in accordance with an embodiment of the disclosure.

The texture lookup tables (LUTs) are Boolean type. In an embodiment, the texture LUTs are generated for the hair class only. FIG. 10 is a diagram illustrating gradient-based distinctiveness functions for hair class as compared to background class, in accordance with an embodiment of the disclosure. In this example, it is assumed that the background pixels in the hair area may have similar texture properties with the selected background area. At the same time, there may be certain hair texture features that are unique against the background texture (gradient) features. Based on these criteria, if a hair texture feature is unique, a value of 1 is assigned to a corresponding index in the LUT, otherwise a value of 0 is assigned, as shown in FIG. 10.

The gradient based distinctiveness indicator functions are derived based on the uniqueness of a gradient. The algorithm first (i) defines a gradient direction with respect to each hair area pixel in the two-dimensional image. For example, the first gradient direction may be represented by $\Delta i=1$ and $\Delta j=0$. For all the hair area pixels, the algorithm (ii) initially sets the hair gradient indicators to 1 for each gradient index (g) as follows:

$g=|haImg(i,j)-haImg(i+\Delta i,j+\Delta j)|$ haGraDiIndicator1$(g)=1$.

The algorithm then (iii) evaluates the uniqueness of the hair gradient indicator against the background class based on the texture LUTs. Similarly, for all the background area pixels, the algorithm resets the hair gradient indicators to 0 if there is a same gradient in the background class as follows:

$g=|bgImg(i,j)-bgImg(i+\Delta i,j+\Delta j)|$ haGraDiIndicator1$(g)=0$, where "haImg" and "bgImg" represent the hair and background exemplar areas respectively in FIG. 8.

After the evaluation of the hair gradient indicators, (iv) the haGraDiIndicator1(.) indices that are not reset represent the hair region uniquely. Additionally, the steps (i) through (iv) are repeated for other gradient directions. In this example, 24 gradient direction functions are utilized. These gradient direction functions are designed to be Boolean type, and therefore use minimal amount of memory.

The computing device 102/104 determines the region of interest based on the BayesRuleSeg( . . . ) function. The BayesRuleSeg( . . . ) function utilizes the class-conditional probability functions and the distinct gradient indicator functions to segment hair regions. The segmentation is based on two parts, namely, Bayes decision rule and distinctive gradient functions.

The Bayes decision rule decides whether a pixel in the hair region has to be assigned to the hair class based on the following expression:

Decide hair if $p(\text{lum}|\text{hair})p(\text{hair})>p(\text{lum}|bg)p(bg);$ where prior probability of hair p(hair)=prior probability of face p(face)=1, and prior probability of background p(bg)=3 (or alternately ¼ and ¾). The prior probability of background is set three times higher than the prior probability of hair. Additionally, the Bayes decision rule may also include the following expression to distinguish between the hair regions and the skin regions in the same two-dimensional image:

Decide hair if $p(\text{lum}|\text{hair})p(\text{hair})>p(\text{lum}|bg)p(bg)$ AND$>p(\text{lum}|\text{skin})$ $p(\text{skin});$ where p(face)=p(skin).

In the distinctive gradient analysis, if any one of the gradient distinctiveness functions indicates that a pixel location is hair, then that pixel is assigned to the hair class as follows:

Check for all k-directions: if one or more haGraDiIndicator-k (.)=1, then assign the pixel to the hair class.

Similarly, each pixel in the hair class region of the two-dimensional ROI image is assigned to the hair class when either the Bayes decision rule or the distinctive gradient analysis determines that the pixels belongs to the hair class. In an embodiment, each pixel in the hair class region of the two-dimensional ROI image is assigned to the hair class when both the Bayes decision rule and the distinctive gradient analysis determine that the pixels belongs to the hair class.

Figure 11:
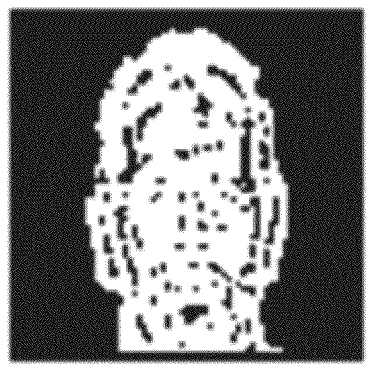
FIG. 11 is a diagram illustrating a screenshot of a Boolean-type image showing the region of interest and a background region, in accordance with an embodiment of the disclosure.

FIG. 11 is a diagram illustrating a screenshot of a Boolean-type image showing the region of interest and a background region, in accordance with an embodiment of the disclosure. With reference to FIG. 11, there is shown a Boolean-type image which is a sample result of the BayesRuleSeg( . . . ) function based on Bayes rule decision and gradient distinctiveness functions.

Figure 12:
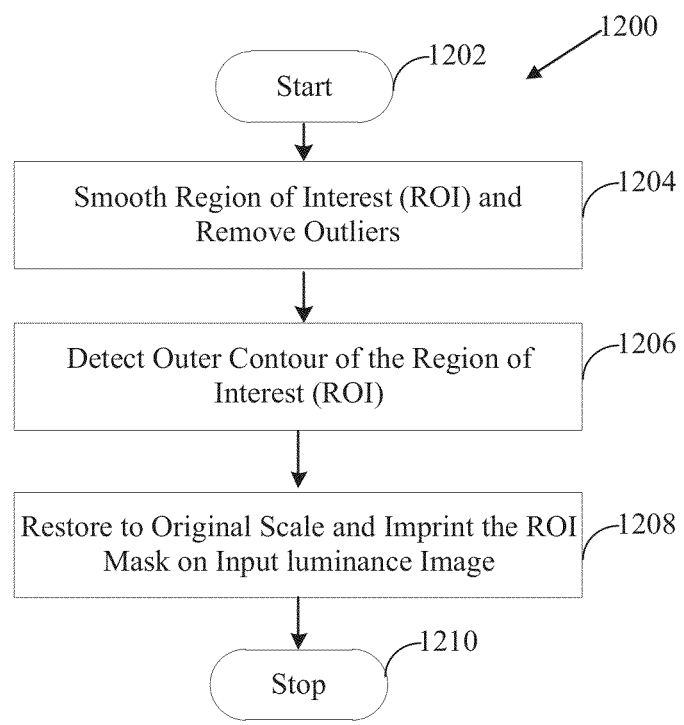
FIG. 12 is a diagram illustrating a method for post-processing of the determined region of interest, in accordance with an embodiment of the disclosure.

FIG. 12 is a diagram illustrating a method for post processing of the determined region of interest, in accordance with an embodiment of the disclosure. FIG. 12 will be described in conjunction with elements of FIG. 1 and FIG. 2. The method 1200 may be implemented in a computing device 102/104 comprising one or more processors 202.

Figure 13A:
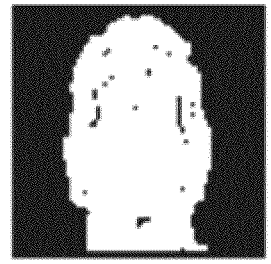
FIG. 13A is a diagram illustrating a screenshot of a smoothed image of the region of interest, in accordance with an embodiment of the disclosure.
Figure 13B:
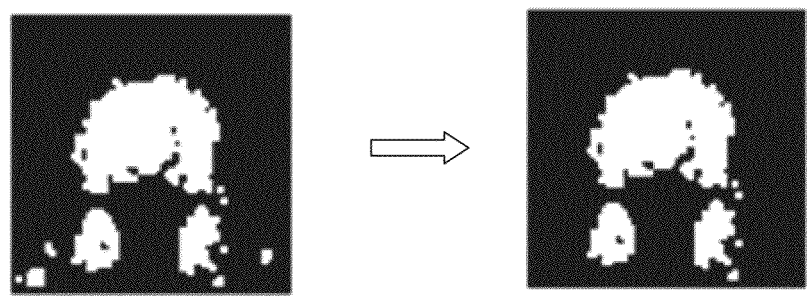
FIG. 13B is a diagram illustrating screenshots of a smoothed image of the region of interest before and after eliminating outlier patches, in accordance with an embodiment of the disclosure.

The method 1200 starts at 1202. At step 1204, the computing device 102/104 may subject the region of interest to image smoothing by filling in the gaps within the region of interest. FIG. 13A is a diagram illustrating a screenshot of a smoothed image of the region of interest, in accordance with an embodiment of the disclosure. The outliers, or disconnected patches, around the smoothed region of interest are removed by the computing device 102/104. FIG. 13B is a diagram illustrating screenshots of a smoothed image of the region of interest before and after eliminating outlier patches, in accordance with an embodiment of the disclosure. The computing device 102/104 executes a function enforceBorderConsist( . . . ) to perform image smoothing and eliminate the outliers.

Figure 13C:
FIG. 13C is a diagram illustrating a screenshot of a region of interest mask, in accordance with an embodiment of the disclosure.

At step 1206, the computing device 102/104 may detect the outer contour of the region of interest to generate a region-of-interest or head mask image. In an embodiment, the computing device 102/104 smoothes the outer contour by a simple moving average operation. The computing device 102/104 creates the hair mask image by filling the area inside the contour with the confidence that the contour represents the head (hair plus face) region. The head mask image is used to assign depth to the head region during 2D to 3D conversion. The computing device 102/104 executes a function hairBorderDetect( . . . ) to detect the outer contour and generate the head mask image. FIG. 13C is a diagram illustrating a screenshot of the region of interest mask, in accordance with an embodiment of the disclosure.

Figure 13D:
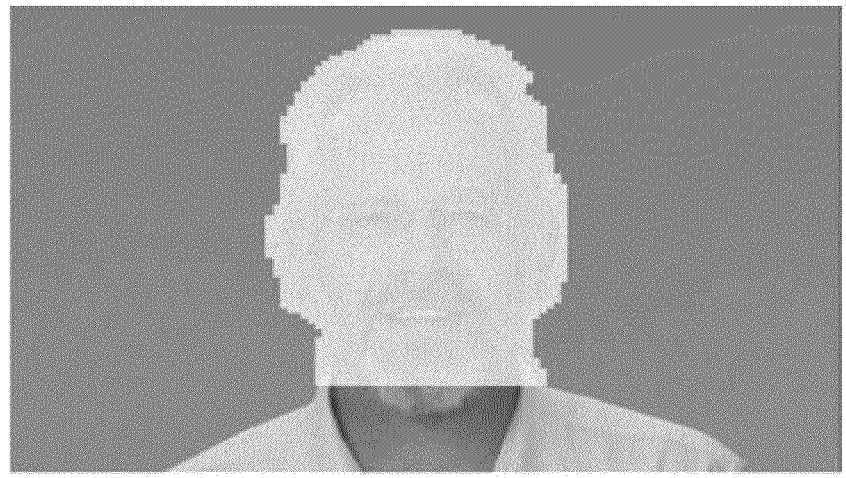
FIG. 13D is a diagram illustrating a screenshot of the mask image superimposed on the two-dimensional input image, in accordance with an embodiment of the disclosure.

At step 1208, the computing device 102/104 may restore the original scale of the hair mask image to the scale of the two-dimensional input image. The computing device 102/104 executes a function imprintTheFaceMask( . . . ) to restore the scaling of the resulting head mask image. The scale of the head mask image is restored to establish correct correspondence between the hair (or head) mask and the two-dimensional input image to imprint the head mask on the two-dimensional input image. FIG. 13D is a diagram illustrating a screenshot of the mask image superimposed on the two-dimensional input image, in accordance with an embodiment of the disclosure. At step 1210, the method 1200 ends.

In accordance with another embodiment of the disclosure, a method and system for image processing may comprise a computing device 102/104 communicatively coupled to a media management device 106.

The computing device 102/104 may comprise one or more processors, for example, processor 202 (FIG. 2) that may be operable to determine luminance values of multiple pixels in a subset of a frame of a two-dimensional image. The processor 202 may be operable to determine texture values of the pixels in the subset of the frame based on distinctive gradients of the pixels. The processor 202 may be further operable to identify a subject region and a background region in the frame of the two-dimensional image based on the determined luminance values and the determined texture values of the pixels.

In an embodiment, the processor 202 may be further operable to generate a first set of values and a second set of values from the first two-dimensional image. The processor 202 may be operable to determine a region of interest in the first two-dimensional image. In another embodiment, the processor 202 may be operable to determine a region of interest in a second two-dimensional image. The processor 202 may be operable to determine a first class of pixels and a second class of pixels in the second two-dimensional image based on the first set of values. The processor 202 may be operable to analyze texture of the first class of pixels and the second class of pixels in the second two-dimensional image based on the second set of values.

The system may further comprise a memory (for example, database memory or memory 204) operable to store a first set of lookup tables (LUTs) corresponding to the first set of values and a second set of LUTs corresponding to the second set of values. The first set of LUTs store histogram counts of luminance values of the first class of pixels and the second class of pixels of the first two-dimensional image. The second set of LUTs store the gradient distinctiveness indicator functions for the first class of pixels of the first two-dimensional image.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising determining a subject region and a background region in a two-dimensional image. Luminance values of multiple pixels in a subset of a frame of the two-dimensional image are determined. Texture values of the multiple pixels in the subset of the frame are determined. The subject region and the background region in the frame of the two-dimensional image are identified based on the determined luminance values and the determined texture values of the multiple pixels In an embodiment, the computing device 102/104 may be further operable to perform automatic depth assignment to human faces in images for 2D-to-3D image/video conversion. In another embodiment, the results of the determination of the subject region and the background region may be utilized by external systems to perform automatic depth assignment to human faces for 2D-to-3D image/video conversion. In addition, the determination of the subject region and the background region in accordance with embodiments of the disclosure may have applications in face recognition, age/gender recognition, digital hair styling, and human machine interface applications, such as gesture recognition and head pose estimation.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to particular embodiments disclosed, but that the present disclosure will include all embodiments falling within the scope of the appended claims.

What is claimed is:

1. A method for image processing, said method comprising:
   in a computing device:
      determining luminance values of a plurality of pixels in a subset of a frame of a two-dimensional image;
      determining texture values of said plurality of pixels in said subset of said frame; and
      identifying a subject region and a background region in said frame of said two-dimensional image based on said determined luminance values and said determined texture values of said plurality of pixels, wherein said identification of said subject region and said background region in said frame of said two-dimensional image comprises classifying said plurality of pixels into a first class and/or a second class based on a comparison of said luminance values and said texture values of said plurality of pixels with a first set of lookup tables and a second set of lookup tables respectively.

2. The method of claim 1, comprising storing said luminance values and said texture values of said plurality of pixels in said first set of lookup tables and said second set of lookup tables respectively.

3. The method of claim 1, wherein said first class comprises a head class and said second class comprises a background class, wherein said head class comprises a face class and a hair class.

4. The method of claim 1, comprising converting said two-dimensional image to a three-dimensional image based on said identification of said subject region and said background region in said two-dimensional image.

5. A method for image processing, said method comprising:
   in a computing device:
      generating a first set of values based on luminance of a first class of pixels and a second class of pixels in a first two-dimensional image; and
      generating a second set of values based on texture of said first class of pixels and said second class of pixels in said first two-dimensional image, wherein said generated first set of values and said generated second set of values are used to classify a subject pixel into one of a first class of pixels and a second class of pixels based on a comparison of a luminance value of said subject pixel and a texture value of said subject pixel with said generated first set of values and said generated second set of values respectively.

6. The method of claim 5, wherein said subject pixel belongs to said first two dimensional image.

7. The method of claim 5, wherein said subject pixel belongs to a second two dimensional image different from said first two-dimensional image.

8. The method of claim 5, wherein said first set of values corresponds to a first set of lookup tables that store histogram counts of luminance values of said first class of pixels and said second class of pixels in said first two-dimensional image.

9. The method of claim 5, wherein said second set of values corresponds to a second set of lookup tables that store gradient distinctiveness indicator functions for said first class of pixels.

10. A method for image processing, said method comprising:
    in a computing device:
       determining a region of interest in a two-dimensional image, comprising:
          determining a first class of pixels and a second class of pixels in said two dimensional image based on a first set of predetermined values corresponding to a luminance of said two-dimensional image, wherein said determination of said first class of pixels and said second class of pixels in said two-dimensional image comprises:
             predicting a first region and a second region in said two-dimensional image corresponding to said first class of pixels and said second class of pixels; and
             computing class-conditional probability functions based on luminance of said first and second class of pixels and said first set of predetermined values; and
          analyzing texture of said first class of pixels and said second class of pixels based on a second set of predetermined values corresponding to said texture of said two-dimensional image; and
       converting said two-dimensional image to a three-dimensional image based on said determination of said region of interest in said two-dimensional image.

11. The method of claim 10, further comprising generating said two-dimensional image from a two-dimensional input image, wherein said two-dimensional input image corresponds to an image frame from a sequence of moving image frames.

12. The method of claim 11, wherein said generation of said two-dimensional image from said two-dimensional input image comprises cropping, resizing and/or down- quantizing said two-dimensional input image.

13. The method of claim 10, wherein said class-conditional probability functions are computed using Bayes rule.

14. The method of claim 10, wherein said predicted first region and said predicted second region comprise a head region and a background region respectively.

15. The method of claim 10, wherein said first set of predetermined values corresponds to a first set of lookup tables to store histogram counts of luminance values of said first class of pixels and said second class of pixels of one or more of said two-dimensional image and at least one previous two-dimensional image.

16. The method of claim 10, wherein said analyses of said texture comprises:
computing gradient distinctiveness indicator functions for said first class of pixels and said second class of pixels; and
determining uniqueness of said first class of pixels as compared to said second class of pixels based on said computed gradient distinctiveness indicator functions and said second set of predetermined values.

17. The method of claim 10, wherein said second set of predetermined values corresponds to a second set of lookup tables to store said gradient distinctiveness indicator functions for said first class of pixels of one or more of said two-dimensional image and at least one previous two-dimensional image.

18. The method of claim 10, wherein said first class comprises a head class and said second class comprises a background class, wherein said head class comprises a face class and a hair class.

19. The method of claim 10, wherein said determined region of interest comprises one or both: of a hair region and/or a head region.

20. The method of claim 10, wherein said determined region of interest is represented as a Boolean-type image.

21. The method of claim 10, further comprising:
smoothing said determined region of interest;
eliminating outliers around said smoothed region of interest;
detecting an outer contour of said region of interest to generate a region of interest mask image; and
restoring said region of interest mask image to an original scale of a two-dimensional input image.

22. A system for image processing, said system comprising:
one or more processors in said computing device being operable to:
determine luminance values of a plurality of pixels in a subset of a frame of a two-dimensional image;
determine texture values of said plurality of pixels in said subset of said frame based on distinctive gradients of said plurality of pixels; and
identify a subject region and a background region in said frame of said two-dimensional image based on said determined luminance values and said determined texture values of said plurality of pixels, wherein said one or more processors are operable to identify said subject region and said background region in said frame of said two-dimensional image by classifying said plurality of pixels into a first class and/or a second class based on a comparison of said luminance values and said texture values of said plurality of pixels with a first set of lookup tables and a second set of lookup tables respectively.

23. The system of claim 22, further comprising a memory operable to store:
said first set of lookup tables corresponding to said determined luminance values; and
said second set of lookup tables corresponding to said determined texture values.

24. The system of claim 22, wherein said first class comprises a head class and said second class comprises a background class, wherein said head class comprises a face class and a hair class.

25. The system of claim 22, wherein said one or more processors are operable to convert said two-dimensional image to a three-dimensional image based on said identification of said subject region and said background region in said two-dimensional image.

26. A non-transitory computer-readable storage medium having stored thereon, a computer program having at least one code section for image processing, the at least one code section being executable by a computer for causing said computer to perform steps comprising:
determining luminance values of a plurality of pixels in a subset of a frame of a two-dimensional image;
determining texture values of said plurality of pixels in said subset of said frame; and
identifying a subject region and a background region in said frame of said two-dimensional image based on said determined luminance values and said determined texture values of said plurality of pixels, wherein said identification of said subject region and said background region in said frame of said two-dimensional image comprises classifying said plurality of pixels into a first class and/or a second class based on a comparison of said luminance values and said texture values of said plurality of pixels with a first set of lookup tables and a second set of lookup tables respectively.

* * * * *